(12) United States Patent
Fischer et al.

(10) Patent No.: US 11,858,038 B2
(45) Date of Patent: Jan. 2, 2024

(54) METHOD FOR ADDITIVELY MANUFACTURING A COMPONENT, AND AN ADDITIVELY MANUFACTURED COMPONENT

(71) Applicant: SKZ-KFE gGmbH, Würzburg (DE)

(72) Inventors: Christian Fischer, Würzburg (DE); Christian Staudigel, Würzburg (DE)

(73) Assignee: SKZ-KFE gGmbH, Würzburg (DE)

( * ) Notice: Subject to any disclaimer, the term of this patent is extended or adjusted under 35 U.S.C. 154(b) by 626 days.

(21) Appl. No.: 16/608,762

(22) PCT Filed: Mar. 2, 2018

(86) PCT No.: PCT/EP2018/055152
§ 371 (c)(1),
(2) Date: Oct. 28, 2019

(87) PCT Pub. No.: WO2018/197082
PCT Pub. Date: Nov. 1, 2018

(65) Prior Publication Data
US 2020/0198006 A1 Jun. 25, 2020

(30) Foreign Application Priority Data
Apr. 28, 2017 (DE) ...................... 10 2017 207 210.5

(51) Int. Cl.
*B22F 1/103* (2022.01)
*B22F 10/10* (2021.01)
(Continued)

(52) U.S. Cl.
CPC ............... *B22F 1/10* (2022.01); *B22F 1/103* (2022.01); *B22F 10/10* (2021.01); *B22F 10/16* (2021.01);
(Continued)

(58) Field of Classification Search
CPC ...................................................... B22F 10/10
See application file for complete search history.

(56) References Cited

U.S. PATENT DOCUMENTS

| 5,439,627 A | 8/1995 | De Jager |
| 5,745,834 A | 4/1998 | Bampton et al. |

(Continued)

FOREIGN PATENT DOCUMENTS

| CN | 1058618 A | 2/1992 |
| CN | 1233988 A | 11/1999 |

(Continued)

OTHER PUBLICATIONS

Vail, N. K., et al. "Development of a poly (methyl methacrylate-co-n-butyl methacrylate) copolymer binder system." Journal of applied polymer science 52.6 (1994): 789-812. (Year: 1994).*

(Continued)

*Primary Examiner* — Jophy S. Koshy
*Assistant Examiner* — Joshua S Carpenter
(74) *Attorney, Agent, or Firm* — McGlew and Tuttle, P.C.

(57) ABSTRACT

A process for the additive manufacture of a metallic and/or vitreous and/or ceramic component, a mixture of substrate particles and an at least two-phase binder is firstly provided. The mixture is preferably provided as composite particles, so that the substrate particles adhere to one another by the at least two-phase binder. The mixture is selectively melted layerwise by electromagnetic radiation so that a shaped part is additively produced. The shaped part is taken out from the mixture which has not been melted and the at least two-phase binder is subsequently removed, preferably successively. The process produces a microporous shaped part which after sintering leads to a component having a desired density and a desired mechanical and/or thermal stability.

29 Claims, 7 Drawing Sheets

(51) Int. Cl.
  *B33Y 10/00* (2015.01)
  *B22F 1/10* (2022.01)
  *B33Y 70/00* (2020.01)
  *B33Y 80/00* (2015.01)
  *B22F 10/60* (2021.01)
  *B22F 10/37* (2021.01)
  *B22F 10/34* (2021.01)
  *B22F 10/16* (2021.01)
  *B22F 10/38* (2021.01)

(52) U.S. Cl.
  CPC .............. *B22F 10/34* (2021.01); *B22F 10/37* (2021.01); *B22F 10/38* (2021.01); *B22F 10/60* (2021.01); *B33Y 70/00* (2014.12); *B33Y 80/00* (2014.12); *B33Y 10/00* (2014.12)

(56) References Cited

U.S. PATENT DOCUMENTS

| | | | |
|---|---|---|---|
| 5,879,743 | A | 3/1999 | Revankar |
| 6,110,411 | A | 8/2000 | Clausen et al. |
| 2004/0182202 | A1 | 9/2004 | Geving et al. |
| 2006/0226569 | A1 | 10/2006 | Henneck et al. |
| 2016/0168453 | A1 | 6/2016 | Florio et al. |
| 2017/0021425 | A1* | 1/2017 | Fang .................... B22F 3/16 |
| 2017/0144222 | A1* | 5/2017 | Daute .................. B33Y 70/00 |
| 2017/0297109 | A1* | 10/2017 | Gibson ................ B28B 1/001 |

FOREIGN PATENT DOCUMENTS

| | | | |
|---|---|---|---|
| CN | 101460426 A | 6/2009 | |
| CN | 104837584 A | 8/2015 | |
| CN | 105451950 A | 3/2016 | |
| CN | 105970140 A | 9/2016 | |
| CN | 106 334 792 A | 1/2017 | |
| CN | 106457404 A | 2/2017 | |
| DE | 696 07 975 T2 | 8/2000 | |
| DE | 10 2005 033 625 B4 | 2/2007 | |
| JP | 5439861 B2 | 3/2014 | |
| WO | 95/30503 A1 | 11/1995 | |
| WO | WO-9530503 A1 * | 11/1995 | ............ B22F 1/0059 |
| WO | 97/13601 A1 | 4/1997 | |

OTHER PUBLICATIONS

Subramanian, Kamatchi, et al. "Selective laser sintering of alumina with polymer binders." Rapid Prototyping Journal (1995). (Year: 1995).*

Zocca, Andrea, et al. "Powder-Bed Stabilization for Powder-Based Additive Manufacturing." Advances in Mechanical Engineering, Jan. 2014, doi:10.1155/2014/491581. (Year: 2014).*

Ian Gibson, Ian Gibson. "Additive manufacturing technologies 3D printing, rapid prototyping, and direct digital manufacturing." (2015). (Year: 2015).*

Carter, Giles F. Paul, Donald E.. (1991). Materials Science and Engineering—11.2 Nature of Viscosity in Polymer Liquids and Solutions. ASM International. (Year: 1991).*

Subramanian, K., Vail, N., Barlow, J. and Marcus, H. (1995), "Selective laser sintering of alumina with polymer binders", Rapid Prototyping Journal, vol. 1 No. 2, pp. 24-35.

* cited by examiner

METHOD FOR ADDITIVELY MANUFACTURING A COMPONENT, AND AN ADDITIVELY MANUFACTURED COMPONENT

CROSS REFERENCE TO RELATED APPLICATIONS

This application is a United States National Phase Application of International Application PCT/EP2018/055152 filed Mar. 2, 2018 and claims the benefit of priority under 35 U.S.C. § 119 of German patent application DE 10 2017 207 210.5, filed Apr. 28, 2017, the entire contents of which are incorporated herein by reference.

FIELD OF THE INVENTION

The invention relates to a process for the additive manufacture of a component. Furthermore, the invention relates to an additively manufactured component.

BACKGROUND OF THE INVENTION

A process for the additive manufacture of a metal component is known from WO 97/13601 A1 (corresponds to DE 696 07 975 T2) A shaped body is firstly produced by selective laser sintering of a composite powder. The composite powder is, for example, a polymer-coated metal powder in which a thermoplastic polymer fully covers metal substrate particles. The shaped body is subsequently infiltrated with an aqueous emulsion comprising a heat-curing polymer and a crosslinker for the heat-curing polymer. The shaped body forms a rigid framework as a result. The shaped body is subsequently heated in order to decompose the polymer and sinter the metal substrate particles. The metal component produced by sintering can additionally be impregnated with a low-melting metal, for example copper, so as to increase the density of the metal component. A disadvantage is that this process is time-consuming and, owing to the plant technology required, expensive. In addition, these shaped parts have a high porosity, so that a high and nonuniform shrinkage is caused by sintering. Although the subsequent infiltration with a low-melting metal increases the density and stability of the metal component, the metal component has comparably poor thermal and mechanical properties compared to conventional metal components.

SUMMARY OF THE INVENTION

It is an object of the invention to provide a simple, flexible and economical process for the additive manufacture of a metallic and/or vitreous and/or ceramic component having an adjustable density and an adjustable thermal and/or mechanical stability. The component should, in particular, have a high density and a high thermal and/or mechanical stability.

This object is achieved by a process for the additive manufacture of a component, comprising the steps: providing substrate particles and a binder, wherein the substrate particles are selected from the group consisting of metallic substrate particles, vitreous substrate particles and ceramic substrate particles, and wherein the binder comprises: a thermoplastic polymer, and at least one additive, producing a shaped part wherein a layer of substrate particles and binder being produced and the binder being selectively melted by means of electromagnetic radiation to produce a shaped part layer, and at least one further layer of substrate particles and binder being produced and the binder being selectively melted by means of the electromagnetic radiation to produce at least one further shaped part layer, taking the shaped part out from the layers produced, removing the binder from the shaped part, and sintering the shaped part to obtain the component. The metallic substrate particles and/or the vitreous substrate particles and/or the ceramic substrate particles are, together with the at least two-phase binder, arranged in layers. The binder is, in particular, pulverulent. To produce the shaped part, the binder arranged between the substrate particles is selectively melted layerwise by means of electromagnetic radiation. The molten binder becomes distributed between the substrate particles and holds these together after solidification, so that a comparatively strong shaped part having a low porosity is formed. The porosity is dependent on the proportion, the composition and the melt viscosity of the binder. The at least one additive serves to influence the rheological properties of the thermoplastic polymer or the binder. After it has been made, the solid shaped part is taken out from the unmelted layers produced. The shaped part in this state is referred to as green part. The binder is subsequently removed from the shaped part. Due to the fact that the binder is made up of at least two phases and comprises a thermoplastic polymer and at least one additive, binder removal and thus the porosity of the shaped part from which the binder has been removed can be adjusted simply and flexibly. In the subsequent sintering step, the substrate particles are joined together and form the component. The sintering is, in particular, solid-state sintering.

Due to the substrate particles used and the at least two-phase binder used, the component can be produced with a density which can be set as desired and a mechanical and/or thermal stability which can be set as desired. The at least two-phase binder makes the production of the shaped part with an essentially pore-free and homogeneous microstructure possible. As a result of the mixture of substrate particles and the binder which is provided, the shaped part has a comparatively high density and a sufficient strength to be taken without damage from the unmelted part of the layers and cleaned. In the binder removal, the at least two-phase binder is, in particular, removed successively, so that a microporous structure of the shaped part is obtained. The substrate particles are held together by the thermoplastic polymer in the microporous shaped part. The process of the invention can be applied simply, flexibly and economically. The mixture of substrate particles and the at least two-phase binder which is provided and the in particular successive binder removal from the shaped part make it possible, in particular, to adjust the density and the mechanical and/or thermal stability of the component produced.

A process, wherein the substrate particles and the binder form composite particles, ensures simple and flexible manufacture of the component with an adjustable density and an adjustable stability. As a result of the substrate particles and the binder forming pulverulent composite particles, a homogeneous mixture of the substrate particles and the binder is provided. The composite particles provided in each case comprise the metallic substrate particles and/or the vitreous substrate particles and/or the ceramic substrate particles which are held together by the adhering binder.

A process, wherein the composite particles each comprise a plurality of substrate particles, ensures simple, flexible and inexpensive manufacture of the component. The binder acts as bonding agent between the substrate particles forming the respective composite particle. A plurality of substrate particles per composite particle makes it possible for a shape of the composite particles to be independent of the shape of the substrate particles. Thus, for example, substantially spherical composite particles can be produced without the substrate particles themselves having to be spherical. This reduces the production costs since the substrate particles do not have to be provided in the form of expensive powders having a particular, in particular spherical, powder particle geometry. The average number of substrate particles per composite particle is, in particular, at least 2, in particular at least 5, in particular at least 10, in particular at least 50, in particular at least 100, in particular at least 500, in particular at least 1000, in particular at least 5000, in particular at least 10000, in particular at least 50000, in particular at least 100000. The average number of substrate particles per composite particle is, in particular, not more than 20 000000, in particular not more than 10 000000, in particular not more than 5 000000, in particular not more than 1 000000, in particular not more than 500000, in particular not more than 100000, in particular not more than 50000, in particular not more than 10000, in particular not more than 5000.

The mixture of substrate particles and the at least two-phase binder can be adjusted via the configuration of the composite particles, so that, in particular, the density and the mechanical and/or thermal stability of the component produced can be adjusted by means of the composite particles provided. The composite particles can be arranged as layers in a simple and economical way. To produce the shaped part, the binder of the composite particles is selectively melted layerwise by means of the electromagnetic radiation. For example, a first layer of composite particles is firstly applied to a construction base body and the binder is selectively melted by means of the electromagnetic radiation. For this purpose, the construction base body is positioned in a horizontal x direction and a horizontal y direction relative to the electromagnetic radiation. To apply a second layer, the construction base body is positioned in a vertical z direction relative to an application direction and relative to the electromagnetic radiation. After application of the second layer on top of the first layer, the binder is once again selectively melted by means of the electromagnetic radiation. For this purpose, the construction base body is positioned in the x direction and the y direction relative to the electromagnetic radiation. The application and selective melting of further layers is carried out in a manner corresponding to the application and the selective melting of the second layer until the desired shape part has been produced.

A process, wherein the composite particles have a fluidity which is defined by a Hausner number $H_R$ in accordance with VDI Guideline VDI 3405 sheet 1, wherein the Hausner number $H_R$ is such that: $1 \leq H_R \leq 1.5$, in particular $1 \leq H_R \leq 1.4$, in particular $1 \leq H_R \leq 1.3$, ensures simple and flexible manufacture of the component with an adjustable density and an adjustable stability. The fluidity or flowability of the pulverulent composite particles allows uniform and homogeneous production of the layers. The fluidity or flowability is, in particular, defined as ratio of a poured volume and a tamped volume of the composite particles.

A process, wherein the composite particles in each case have a maximum dimension $A_{max}$ and at least 80% of the composite particles are such that: $0.005$ mm $\leq A_{max} \leq 0.3$ mm, in particular $0.008$ mm $\leq A_{max} \leq 0.2$ mm, in particular $0.01$ mm $\leq A_{max} \leq 0.1$ mm, ensures simple and flexible manufacture of the component with an adjustable density and an adjustable stability. The composite particles firstly ensure that the shaped part before binder removal has an adjustable porosity and an adjustable density. Secondly, the composite particles ensure sufficient fluidity or flowability, so that they can be arranged uniformly and homogeneously in layers. The ranges for the maximum dimension $A_{max}$ preferably apply to at least 90%, in particular at least 95%, of the composite particles. The ranges indicated are applicable, in particular, for a volume-based, cumulative distribution of the composite particles.

A process, wherein the composite particles in each case have a minimum dimension $A_{min}$ and a maximum dimension $A_{max}$ and at least 80% of the composite particles are such that: $0.6 \leq A_{min}/A_{max} \leq 1$, in particular $0.7 \leq A_{min}/A_{max} \leq 1$, in particular $0.8 \leq A_{min}/A_{max} \leq 1$, ensures simple and flexible manufacture of the component with an adjustable density and an adjustable stability. Due to the ratio $A_{min}/A_{max}$, the composite particles are substantially spherical. As a result, the composite particles can be arranged uniformly, homogeneously and with an adjustable density in layers. The ranges indicated for $A_{min}/A_{max}$ preferably apply to at least 90%, in particular at least 95%, of the composite particles. The ranges indicated are applicable, in particular, for a volume-based, cumulative distribution of the composite particles.

A process, wherein the substrate particles are present in a proportion of from 40% by volume to 70% by volume, in particular from 45% by volume to 65% by volume, in particular from 50% by volume to 60% by volume, in the composite particles, ensures simple and flexible manufacture of the component with an adjustable density and an adjustable stability. The density and the stability of the component can be set via the proportion of the substrate particles.

A process, wherein the binder has a melt viscosity of from $10^0$ Pa·s to $10^6$ Pa·s, in particular from $10^0$ Pa·s to $10^5$ Pa·s, in particular from $10^0$ Pa·s to $10^4$ Pa·s, at a temperature which is at least $10°$ C. above a temperature $T_S$, wherein the temperature $T_S$ is a glass transition temperature or a crystallite melting temperature of the binder, and a shear rate is, in particular, selected from the group consisting of $1.00$ s$^{-1}$, $2.50$ s$^{-1}$, $5.00$ s$^{-1}$, $10.0$ s$^{-1}$, $25.0$ s$^{-1}$, $50.0$ s$^{-1}$ and $100$ s$^{-1}$, ensures simple and flexible manufacture of the component with an adjustable density and an adjustable stability. Due to the melt viscosity of the binder, the latter becomes, in the molten state, uniformly and homogeneously distributed between the substrate particles and joins the individual substrate particles or the individual composite particles to form a closed shaped part layer, so as to produce the shaped part. The uniform and homogeneous distribution of the binder results in the microporous structure of the shaped part or brown part after removal of the at least one additive. Due to the microporous structure, the component is produced with an adjustable density and an adjustable stability in the subsequent sintering step. Due to the melt viscosity, the binder thus has a desired fluidity. The determination of the melt viscosity is preferably carried out in accordance with DIN EN ISO 3219 (version: October 1994). The values indicated for the melt viscosity apply in particular for a shear rate of $1.00$ s$^{-1}$. The temperature $T_S$ is in the case of an amorphous structure of the binder the glass transition temperature and in the case of a partially crystalline binder the crystallite melting temperature, in particular the maximum crystallite melting temperature.

A process, wherein the thermoplastic polymer is present in a proportion of from 10% to 70%, in particular from 15% to 50%, in particular from 20% to 40%, in the binder, ensures simple and flexible manufacture of the component with an adjustable density and an adjustable stability. After removal of the at least one additive, the microporous structure of the shaped part or brown part is produced by the substrate particles being held together by means of the thermoplastic polymer. The thermoplastic polymer is subsequently removed. The density and the stability of the component can be set via the proportion of the thermoplastic polymer. The percent values indicated are percent by weight or percent by volume.

A process, wherein the at least one additive is present in a proportion of from 30% to 90%, in particular from 50% to 85%, in particular from 60% to 80%, in the binder, ensures simple and flexible manufacture of the component with an adjustable density and an adjustable stability. The rheological properties of the thermoplastic binder or of the binder and also the density and the stability of the component can be adjusted via the proportion of the at least one additive. The percent values indicated are percent by weight or percent by volume.

A process, wherein the substrate particles in each case have a maximum dimension $B_{max}$ and at least 80% of the substrate particles are such that: 1 $\mu m \leq B_{max} \leq 50$ $\mu m$, in particular 5 $\mu m \leq B_{max} \leq 40$ $\mu m$, in particular 10 $\mu m \leq B_{max} \leq 30$ $\mu m$, ensures simple and flexible manufacture of the component with an adjustable density and an adjustable stability. The ranges indicated preferably apply to at least 90% and in particular at least 95% of the substrate particles. The ranges indicated are applicable, in particular, for a volume-based, cumulative distribution of the substrate particles.

A process according to the invention ensures simple, flexible and economical manufacture of the component. The thermoplastic polymer can be matched in a simple and economical way to the substrate particles and/or the at least one additive. The thermoplastic polymer is selected from among polycondensates, polymerizates, polyadducts and/or thermoplastic elastomers. Polycondensates are, for example, polyamides and/or polyesters. Polymerizates are, for example, polyolefins, polystyrenes, polyacrylates, polyvinylpyrrolidones and/or polyoxymethylenes. Polyadducts are, for example, polyurethanes.

A process, wherein the at least one additive comprises a plasticizer, in particular an ester of an aromatic hydroxybenzoic acid, ensures simple and economical manufacture of the component. Due to the fact that at least one additive is a plasticizer, the fluidity of the thermoplastic polymer or of the binder can be adjusted in a desired manner. The plasticizer is, in particular, an ester of an aromatic hydroxybenzoic acid and preferably is a fatty alcohol ester of p-hydroxybenzoic acid, with the length of the carbon chain preferably being in the range C12-C26, particularly preferably in the range C18-C22. The viscosity of the thermoplastic polymer, in particular, is adjusted or reduced by means of the plasticizer. The plasticizer comprises, in particular, at least one plasticizing substance. For example, the plasticizer is a mixture of a plurality of plasticizing substances.

A process, wherein the layers are applied in a thickness D which is such that: 0.05 mm $\leq D \leq 0.3$ mm, in particular 0.07 mm $\leq D \leq 0.25$ mm, in particular 0.09 mm $\leq D \leq 0.2$ mm, ensures simple and flexible manufacture of the component with an adjustable density and an adjustable stability. Reliable melting of the binder is ensured by the thickness D, so that the molten binder becomes uniformly and homogeneously distributed between the substrate particles and the shaped part is formed after solidification of the binder. The layers are applied by means of an application device to a construction base body or a previously applied layer. The application device is, for example, configured as a doctor blade and/or roller.

A process, wherein the substrate particles and the binder are distributed in a construction region to form a layer, wherein a temperature in the construction region is such that: 20° C. $\leq T_B \leq T_S$, in particular 20° C. $\leq T_B \leq 120$° C., in particular 25° C. $\leq T_B \leq 100$° C., in particular 30° C. $\leq T_B \leq 80$° C., wherein $T_S$ is a glass transition temperature or a crystallite melting temperature of the binder, ensures simple and flexible manufacture of the component with an adjustable density and an adjustable stability. The construction region is located above a construction base body. The construction region is preferably heated by means of at least one heating element. The temperature $T_B$ ensures firstly sufficient fluidity or flowability of the pulverulent composite particles and secondly low shrinkage in the subsequent sintering of the shaped part. In the case of an amorphous structure of the binder, the temperature $T_S$ is the glass transition temperature. In the case of a partially crystalline binder, the temperature $T_S$ is the highest crystallite melting temperature of the binder. For definition of the glass transition temperature and the crystallite melting temperature, reference may be made to DIN EN ISO 11357 part 2 (version: second edition 2013-05-01) and part 3 (version: second edition 2011-05-01).

A process, wherein the binder is removed successively from the shaped part, with, in particular, the at least one additive being removed from the shaped part at least partly before the thermoplastic polymer, ensures simple and flexible manufacture of the component with an adjustable density and an adjustable stability. The successive removal of the at least two-phase binder results in a microporous structure of the shaped part. The substrate particles are held together by the thermoplastic polymer in the microporous shaped part. On further removal of the binder and the subsequent sintering of the microporous shaped part, a low shrinkage therefore occurs, so that the resulting component is homogeneous and has a desired, in particular high, density. The at least one additive, for example a plasticizer, is preferably removed from the shaped part at least partly before the thermoplastic polymer. The at least one additive, for example the plasticizer, is, in particular, able to be dissolved by means of a solvent, while the thermoplastic polymer is insoluble in the solvent. During the successive binder removal, the at least one additive, for example, is largely removed from the shaped part by means of the solvent. For this purpose, the shaped part is preferably dipped into the solvent. After chemical binder removal by means of the solvent, the shaped part is referred to as brown part. The shaped part or brown part is subsequently subjected, for example, to thermal binder removal. In the thermal removal of the binder, both the at least one additive, for example the plasticizer, which has remained in the shaped part and also the thermoplastic polymer which is insoluble in the solvent are removed from the shaped part.

A process, wherein the at least one additive can be dissolved by means of a solvent and the thermoplastic polymer is insoluble in the solvent and the at least one additive is removed at least partially from the shaped part by means of the solvent, ensures simple, flexible and economical construction of the component with an adjustable density and an adjustable stability. The fact that the at least one additive, for example a plasticizer, can be dissolved by means of the solvent while the thermoplastic polymer is insoluble in the solvent makes chemical binder removal of the at least one additive in a simple and economical way possible. After the shaped part has been taken out from the unmelted layers produced, the at least one additive is very largely removed from the shaped part by means of the solvent. For this purpose, the shaped part is preferably dipped into the solvent. The shaped part after the chemical binder removal by means of the solvent is referred to as brown part. The chemical binder removal results in a microporous structure of the shaped part. The substrate particles are held together by the thermoplastic polymer in the microporous shaped part. The fact that the thermoplastic polymer cannot be dissolved by means of the solvent makes successive binder removal from the shaped part and formation of the microporous structure possible in a simple way. The at least one additive, in particular the plasticizer, is preferably acetone-soluble, so that removal of the at least one additive by means of the solvent is simple and economical.

A process, wherein the shaped part is dipped into a solvent in order to remove the at least one additive, wherein a temperature $T_L$ of the solvent is such that: $20°$ C.$\leq T_L \leq 100°$ C., in particular $25°$ C.$\leq T_L \leq 80°$ C., in particular $30°$ C.$\leq T_L \leq 60°$ C., ensures simple and economical manufacture of the component. The temperature $T_L$ firstly makes rapid removal of the at least one additive, for example a plasticizer, from the shaped part possible and secondly ensures the dimensional stability of the shaped part or green part. The removal of the at least one additive occurs all the more quickly, the higher the temperature $T_L$.

A process, wherein from 30% to 100%, in particular from 50% to 90%, in particular from 60% to 80%, of the at least one additive is removed from the shaped part by means of a solvent, ensures simple and economical manufacture of the component. The at least one additive, for example a plasticizer, is preferably removed very completely by means of the solvent. This simplifies the subsequent binder removal or thermal binder removal. The values indicated relate to a proportion of the at least one additive in percent by weight or percent by volume.

A process, wherein the binder is at least partly removed thermally from the shaped part at a first temperature $T_1$, wherein the first temperature $T_1$ is such that: $300°$ C.$\leq T_1 \leq 900°$ C., in particular $400°$ C.$\leq T_1 \leq 800°$ C., in particular $550°$ C.$\leq T_1 \leq 750°$ C., ensures simple and economical manufacture of the component. The thermoplastic polymer and any residual additives present or residues of the at least one additive are burnt out from the shaped part by heating of the microporous shaped part or the brown part after removal of the at least one additive, for example a plasticizer. The first temperature $T_1$ is selected, in particular, as a function of the thermoplastic polymer. The removal of the thermoplastic polymer at the temperature $T_1$ is carried out for a time $\Delta t_1$ which is dependent on the component geometry and in particular is proportional to the square of the wall thickness of the component to be produced. The time $\Delta t_1$ is preferably selected so that at least 95%, in particular at least 99%, in particular at least 99.9% of the binder is removed.

A process according to the invention ensures simple manufacture of the component. Undesirable chemical reactions during the thermal binder removal are avoided by means of the inert gas atmosphere or the reducing atmosphere or the high vacuum. The inert gas atmosphere comprises, in particular, at least one noble gas, for example helium or argon.

A process, wherein at least 95%, in particular at least 99%, in particular at least 99.9%, of the binder has been removed from the shaped part after sintering, ensures simple and flexible manufacture of the component with an adjustable density and an adjustable stability. The substrate particles are joined together by means of the sintering step, so that the component is produced. After sintering, the component has preferably been freed completely of the binder. As a result, the component forms a homogeneous microporous structure having a desired density. The values indicated relate to a proportion of the binder in percent by weight or percent by volume.

A process according to the invention ensures simple and flexible manufacture of the component with an adjustable density and an adjustable stability. The mechanical stability and the thermal stability can be set in a targeted manner as a function of the substrate particles used. Depending on the substrate particles used, components composed of at least one of the materials—metal, glass and ceramic—can be produced. In the production of a metallic component, the second temperature $T_2$ is preferably such that: $600°$ C.$\leq T_2 \leq 2000°$ C., in particular $800°$ C.$\leq T_2 \leq 1800°$ C., in particular $1100°$ C.$\leq T_2 \leq 1500°$ C. In the production of a ceramic and/or vitreous component, the second temperature $T_2$ is preferably such that: $600°$ C.$\leq T_2 \leq 2400°$ C., in particular $800°$ C.$\leq T_2 \leq 2200°$ C., in particular $1100°$ C.$\leq T_2 \leq 2000°$ C. The sintering at the second temperature $T_2$ is carried out for a time $t_2$ which is dependent on the component geometry and in particular is proportional to the square of the wall thickness of the component to be produced. The time $\Delta t_2$ is preferably so long that no relevant change in the porosity of the component can be achieved by subsequent further sintering. Sintering is preferably carried out until a porosity P obeys: $0.01 \leq P \leq 0.15$, in particular $0.03 \leq P \leq 0.12$, in particular $0.05 \leq P \leq 0.09$.

A further object of the invention is to provide an additively manufactured metallic and/or vitreous and/or ceramic component having an adjustable density and an adjustable mechanical and/or thermal stability. The component should in particular have a high density and a high mechanical and/or thermal stability.

This object is achieved by a component composed of at least one of the materials metal, glass and ceramic, wherein pores are present in an interior of the component and at a component surface, wherein at least 80%, in particular at least 85%, in particular at least 90%, of the pores have a maximum dimension ($d_{max}$) in the range from 1 µm to 100 µm, in particular from 10 µm to 80 µm, in particular from 20 µm to 60 µm. Due to the features of the inventive additive manufacturing process, the component has a microporous structure after sintering. The microporous structure comprises closed pores in the interior of the component and open pores at the component surface. The microporous structure ensures an adjustable density and an adjustable mechanical and/or thermal stability as a function of the material used or the materials used.

A component, wherein a porosity P is such that: $0.01 \leq P \leq 0.15$, in particular $0.03 \leq P \leq 0.12$, in particular $0.05 \leq P \leq 0.09$, ensures an adjustable density and an adjustable stability. The porosity P is defined by the ratio of pore volume to component volume.

A component, wherein the component surface has a surface roughness $r_Z$, wherein the surface roughness $r_Z$ is such that: $5 \mu m \leq r_Z \leq 200 \mu m$, in particular $10 \mu m \leq r_Z \leq 120 \mu m$, in particular $15 \mu m \leq r_Z \leq 100 \mu m$, makes advantageous applications possible. The size of the pores results in a surface roughness because of the open pores on the component surface. The surface roughness due to the additive manufacture is advantageous for particular applications, for example in the field of implants. The surface roughness $r_Z$ is defined in accordance with DIN EN ISO 4287 (version: October 1998) and measured by the profile method in accordance with DIN EN ISO 4288 (version: April 1998).

A component according to the invention makes advantageous applications possible. Due to the additive manufacture of the component, the open pores at the component surface at least partly form undercuts. These undercuts can, for example, be utilized in the use of the component as implant for growing-on of tissues.

This object is also achieved by a component produced according to the features of the inventive additive manufacturing process.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
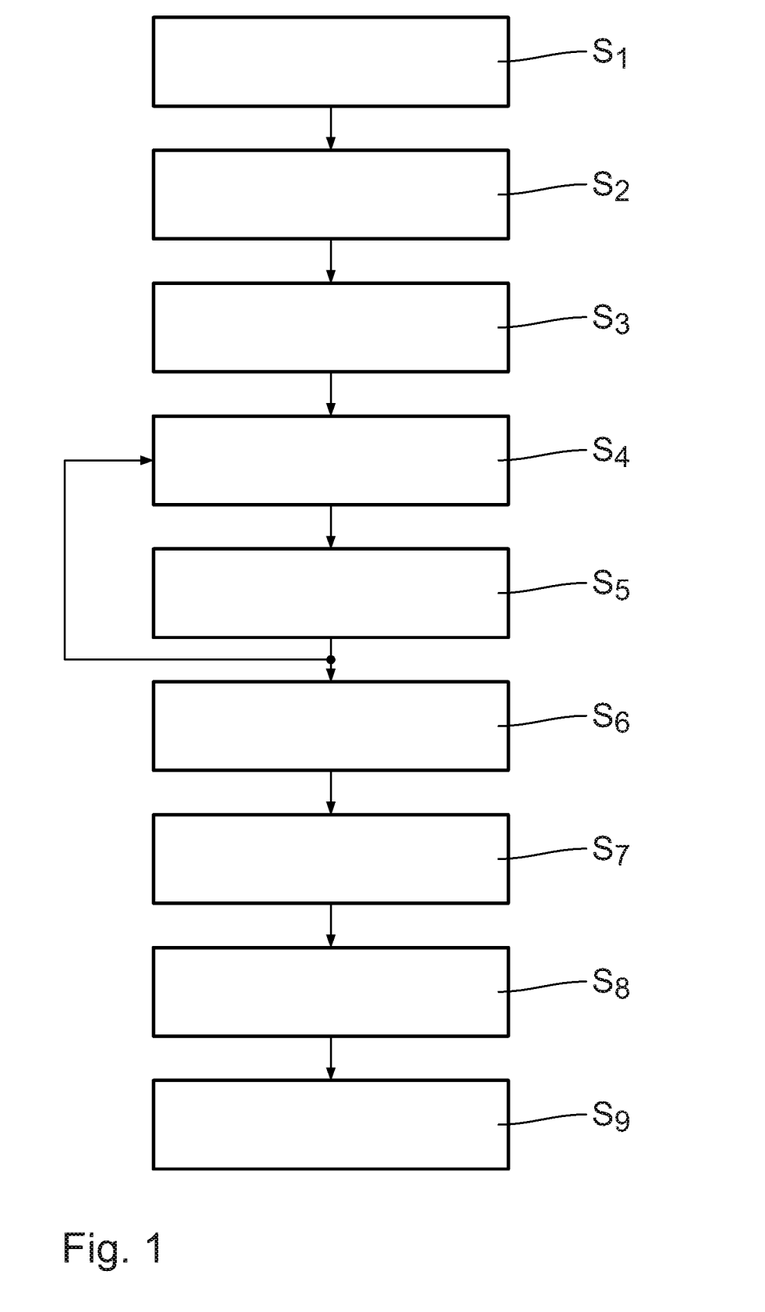
FIG. 1 is a view of a flow diagram of a process for the additive manufacture of a component.
Figure 4:
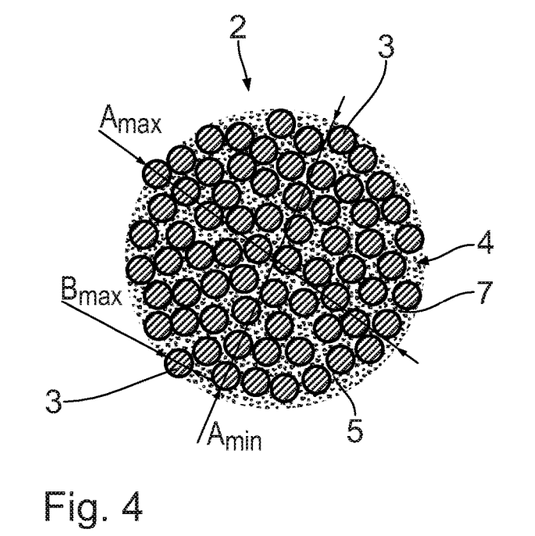
FIG. 4 is a schematic view of a composite particle comprising substrate particles and a two-phase binder.

For the additive manufacture of a component 1, composite particles 2 are provided in a process step $S_1$. The composite particles 2 each comprise metallic and/or vitreous and/or ceramic substrate particles 3 which adhere to one another by means of a two-phase binder 4. The two-phase binder 4 in turn comprises an additive 5 in the form of a plasticizer, which can be dissolved by means of a solvent 6, and a thermoplastic polymer 7, which is insoluble in the solvent 6.

The composite particles 2 have a fluidity or flowability defined by a Hausner factor $H_R$ in accordance with VDI Guideline VDI 3405 sheet 1 (version: October 2013), wherein the Hausner factor $H_R$ is such that: $1 \leq H_R \leq 1.5$, in particular $1 \leq H_R \leq 1.4$, in particular $1 \leq H_R \leq 1.3$.

Figure 5:
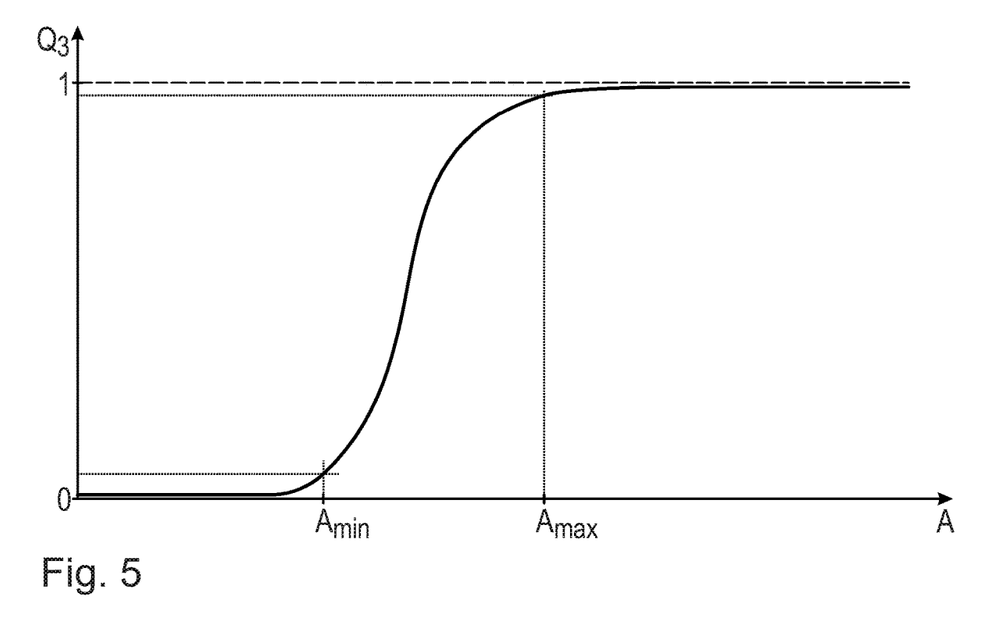
FIG. 5 is a view of a volume-based, cumulative distribution of the composite particles.

Furthermore, the composite particles 2 in each case have a minimum dimension $A_{min}$ and a maximum dimension $A_{max}$. At least 80%, in particular at least 90%, in particular at least 95%, of a volume-based, cumulative distribution $Q_3$ of the composite particles 2 obeys: $0.005 \text{ mm} \leq A_{max} \leq 0.3$ mm, in particular $0.008 \text{ mm} \leq A_{max} \leq 0.2$ mm, in particular $0.01 \text{ mm} \leq A_{max} \leq 0.1$ mm. The volume-based, cumulative distribution $Q_3$ of the composite particles 2 as a function of a dimension A is shown by way of example in FIG. 5. Furthermore, the composite particles 2 are substantially spherical, so that at least 80%, in particular at least 90%, in particular at least 95%, of a volume-based, cumulative distribution of the composite particles 2 obeys: $0.6 \leq A_{min}/A_{max} \leq 1$, in particular $0.7 \leq A_{min}/A_{max} \leq 1$, in particular $0.8 \leq A_{min}/A_{max} \leq 1$.

The substrate particles 3 are in each case present in a proportion of from 40% by volume to 70% by volume, in particular from 45% by volume to 65% by volume, in particular from 50% by volume to 60% by volume, in the composite particles 2. The substrate particles 3 in each case have a maximum dimension $B_{max}$, wherein at least 80%, in particular at least 90%, in particular at least 95%, of a volume-based, cumulative distribution of the substrate particles 3 obeys: $1 \text{ μm} \leq B_{max} \leq 50$ μm, in particular 5 $\text{μm} \leq B_{max} \leq 40$ μm, in particular $10 \text{ μm} \leq B_{max} \leq 30$ μm.

The substrate particles 3 are held together by the two-phase binder 4 and thus form the pulverulent composite particles 2. The binder 4 has a melt viscosity of from $10^0$ Pa·s to $10^6$ Pa·s, in particular from $10^0$ Pa·s to $10^5$ Pa·s, in particular from $10^0$ Pa·s to $10^4$ Pa·s at a temperature which is at least 10° C. above a temperature $T_S$, wherein the temperature $T_S$ is in the case of an amorphous structure of the binder 4 the glass transition temperature and in the case of a partially crystalline binder 4 is the crystallite melting temperature of the binder 4. The determination of the melt viscosity is carried out in accordance with DIN EN ISO 3219 (version: October 1994) and in particular at a shear rate selected from the group consisting of $1.00 \text{ s}^{-1}$, $2.50 \text{ s}^{-1}$, $5.00 \text{ s}^{-1}$, $10.0 \text{ s}^{-1}$, $25.0 \text{ s}^{-1}$, $50.0 \text{ s}^{-1}$ and $100 \text{ s}^{-1}$. The indicated values of the melt viscosity apply, in particular, at a shear rate of $1.00 \text{ s}^{-1}$. In the two-phase binder 4, the thermoplastic polymer 7 is present in a proportion of from 10% by weight to 70% by weight, in particular from 15% by weight to 50% by weight, in particular from 20% by weight to 40% by weight, and the plasticizer 5 is present in a proportion of from 30% by weight to 90% by weight, in particular from 50% by weight to 85% by weight, in particular from 60% by weight to 80% by weight. The binder 4 can optionally contain additional additives.

The thermoplastic polymer 7 is selected from the group consisting of polycondensates, polymerizates, polyadducts and thermoplastic elastomers. The plasticizer 5 is an ester of an aromatic hydroxybenzoic acid, preferably a fatty alcohol ester of p-hydroxybenzoic acid, with a length of the carbon chain preferably being in the range C12-C26, in particular in the range C18-C22. The plasticizer 5 serves to adjust the melt viscosity and the rheological properties of the binder 4.

The composite particles 2 are, for example, produced by subjecting a suspension composed of the substrate particles 3 and an alcoholic medium in which the binder 4 has been dissolved to spray drying.

Figure 2:
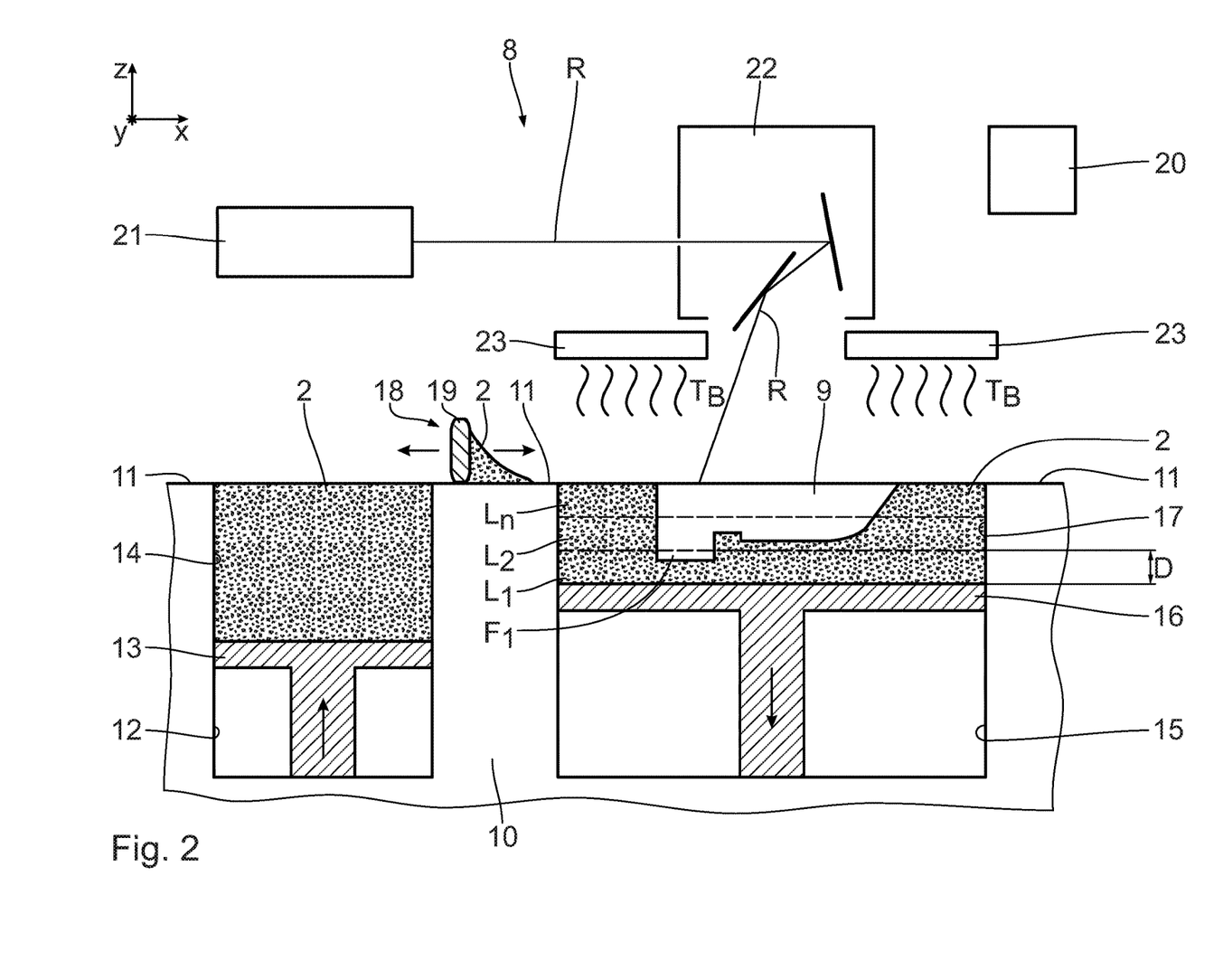
FIG. 2 is a schematic view of an apparatus for the additive manufacture of a shaped part, from composite particles.

The composite particles 2 are provided by means of an apparatus 8 for the additive manufacture of a shaped part 9. For this purpose, the apparatus 8 has a base body 10 which has a flat surface 11 running in a horizontal x direction and in a horizontal y direction. A reservoir recess 12 is formed in the base body 10 and together with a plate 13 which can be moved in a vertical z direction gives a reservoir space 14 for the composite particles 2. The reservoir space 14 is open in the direction of the surface 11. The composite particles 2 are provided in the reservoir space 14. The pulverulent composite particles 2 are also referred to as feedstock powder. The x, y and z directions form a Cartesian coordinate system.

Next to the reservoir recess 12 in the x direction there is a construction recess 15 provided in the base body 10. The construction recess 15 extends in the x direction and the y direction and defines a construction field. A construction base body 16 which can be moved in the z direction is arranged in the construction recess 15. The construction base body 16 is preferably configured as construction platform. The construction recess 15 and the construction base body 16 bound a construction space 17 which is open in the direction of the surface 11.

In a process step $S_2$, a first layer $L_1$ of composite particles 2 is applied to the construction base body 16 by means of an application device 18. The application device 18 is arranged above the surface 11 in the z direction and conveys composite particles 2 provided into the construction space 17. For this purpose, the application device 18 has, for example, a doctor blade 19 which extends in the y direction and can be moved in the x direction along the surface 11. To apply the first layer $L_1$, the plate 13 is firstly moved in the z direction so that a desired amount of the composite particles 2 is present above the surface 11. The doctor blade 19 is subsequently moved in the x direction so that the doctor blade 19 carries along the composite particles 2 located above the surface 11 and conveys them into the construction space 17 and distributes them uniformly there. The movement of the plate 13, the doctor blade 19 and the construction base body 16 is controlled by means of a control device 20. The first layer $L_1$ is applied in a thickness D which is determined by the distance of the construction base body 16 from the surface 11.

Figure 3:
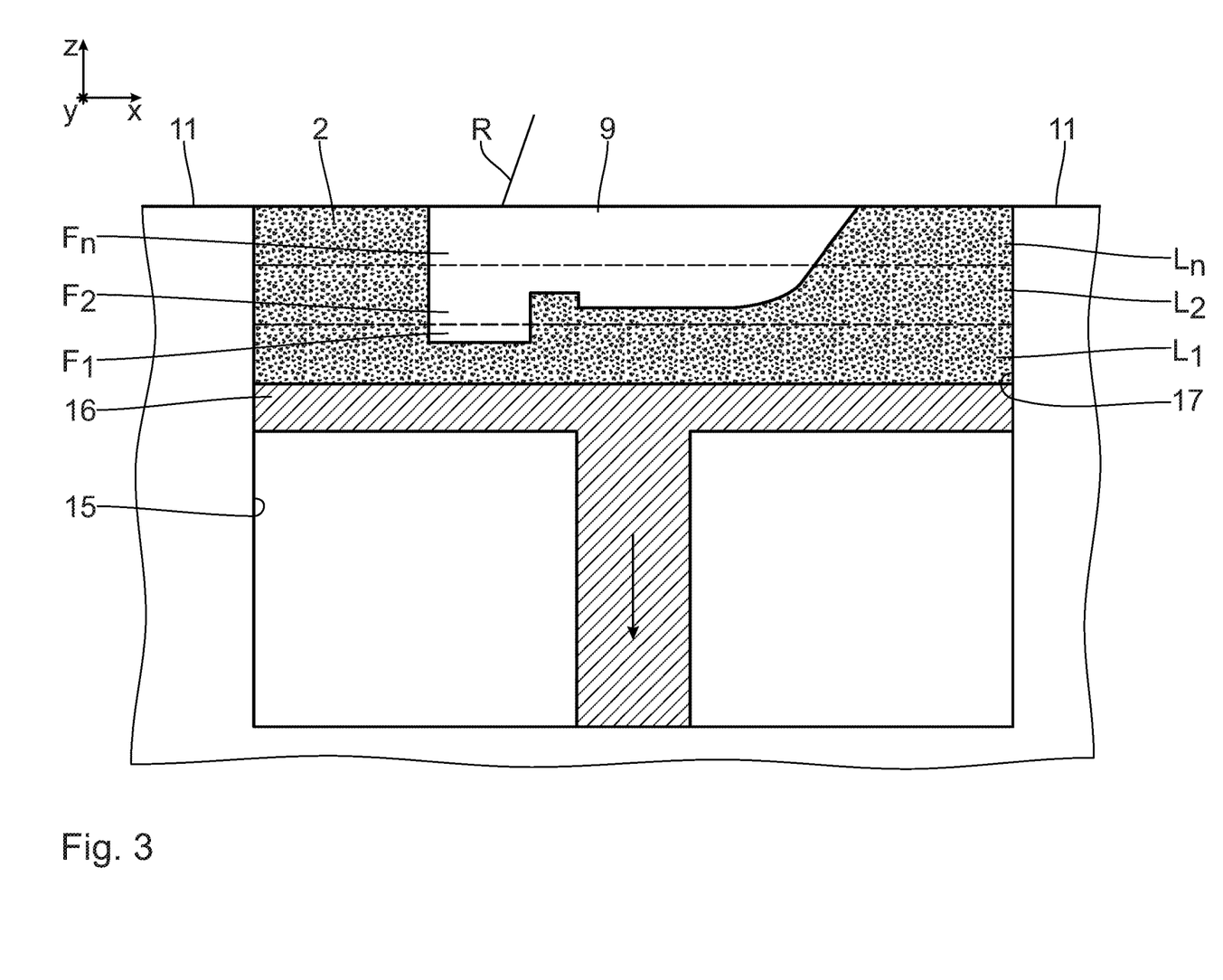
FIG. 3 is an enlarged view of a construction space of the apparatus in FIG. 2.

In a process step $S_3$, the binder 4 of the composite particles 2 in the first layer $L_1$ is selectively melted, so that a first shaped part layer $F_1$ is formed. The first layer $L_1$ is closest to the surface 11 in this process step and forms a construction region. The construction region is heated to a temperature $T_B$ by means of heating elements 23. The temperature $T_B$ in the construction region is such that: $20°\text{C}.\leq T_B \leq T_S$, in particular $20°\text{C}.\leq T_B \leq 120°\text{C}.$, in particular $25°\text{C}.\leq T_B \leq 100°\text{C}.$, in particular $30°\text{C}.\leq T_B \leq 80°\text{C}.$ $T_S$ is in the case of an amorphous structure of the binder 4 the glass transition temperature or in the case of a partially crystalline or crystalline structure of the binder 4 the highest crystallite melting temperature of the binder 4. The selective melting is carried out by means of electromagnetic radiation R, in particular by mean of laser radiation. The electromagnetic radiation R is generated by means of an electromagnetic radiation source 21 and directed by means of a mirror device 22 onto the construction field. The mirror device 22 allows the electromagnetic radiation R striking the construction field to be moved in the x direction and the y direction. To produce the first shaped part layer $F_1$, the electromagnetic radiation R is moved in the x direction and/or the y direction according to the shaped part 9 to be produced. The electromagnetic radiation R melts the binder 4, so that the binder 4 spreads between the substrate particles 3 and on solidification forms the solid first shaped part layer $F_1$.

In a process step $S_4$, a further layer $L_2$ of composite particles 2 is applied in the above-described manner to the previously applied layer $L_1$. For this purpose, the plate 13 is moved in the z direction so that a desired amount of composite particles 2 is present above the surface 11 and can be transported by means of the application device 18 to the construction space 17. To apply the layer $L_2$, the construction base body 16 is lowered by the thickness D in the z direction, so that the composite particles 2 can be distributed uniformly and homogeneously on top of the previously applied layer $L_1$.

In a process step $S_5$, the binder 4 of the composite particles 2 in the layer $L_2$ are selectively melted in the above-described manner by means of the electromagnetic radiation R, so that a further shaped part layer $F_2$ is produced. The molten binder 4 spreads between the substrate particles 3 and holds these together after solidification of the binder 4. The thickness D of the applied layers $L_1$, $L_2$ is such that: 0.05 mm$\leq$D$\leq$0.3 mm, in particular 0.07 mm$\leq$D$\leq$0.25 mm, in particular 0.09 mm$\leq$D$\leq$0.2 mm. The process steps $S_4$ and $S_5$ are repeated until the shaped part 9 has been additively manufactured in the desired way. In FIG. 3, three layers $L_1$, $L_2$ and $L_n$ and three shaped part layers $F_1$, $F_2$ and $F_n$ where n=3 are depicted by way of example. As an alternative, it is possible for a layer or a plurality of layers of composite particles 2 firstly to be applied before the binder 4 is melted by means of the electromagnetic radiation R and a solid first shaped part layer $F_1$ is formed. The shaped part 9 is in this case arranged on at least one layer which has not been melted.

In a process step $S_6$, the shaped part 9 is taken out from the composite particles 2 which have not been melted and out of the construction space 17 and cleaned. The shaped part 9 is also referred to as green part.

Figure 6:
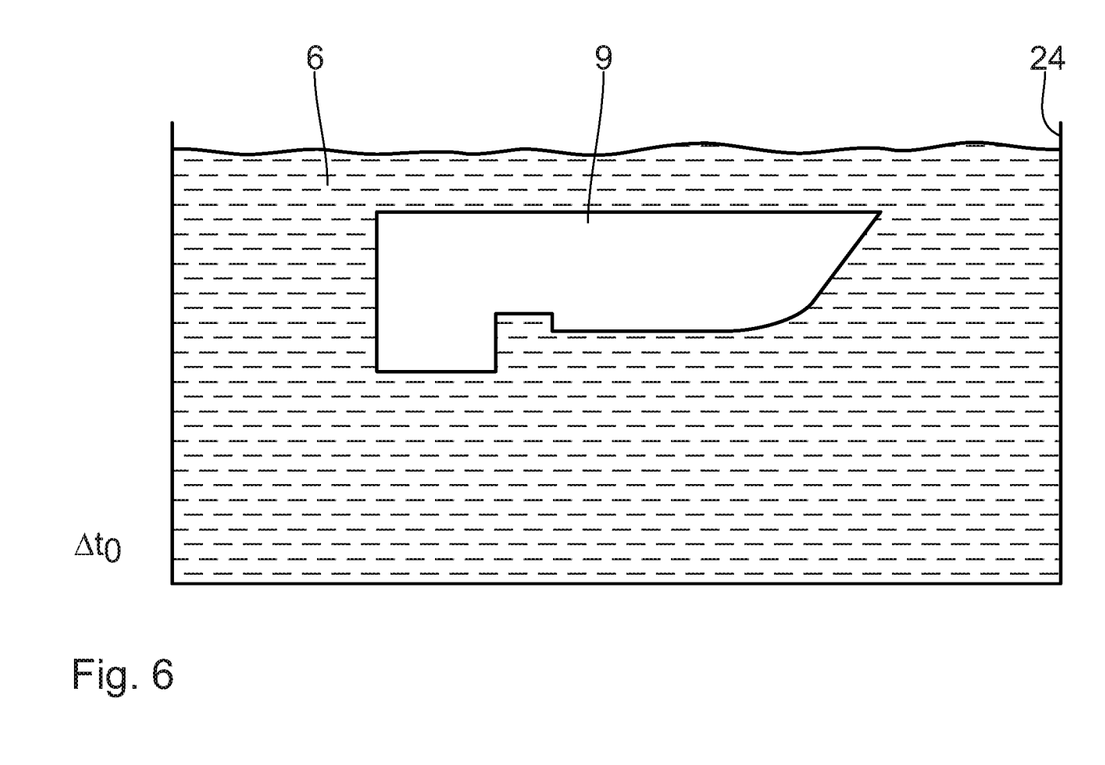
FIG. 6 is a view of a schematic view of a vessel with solvent for chemical removal of binder from the shaped part.

In a process step $S_7$, the shaped part 9 is subjected to chemical binder removal. For this purpose, the shaped part 9 is dipped into a vessel 24 filled with the solvent 6. This is shown in FIG. 6. Acetone, for example, serves as solvent 6. The solvent 6 dissolves the plasticizer 5 out from the shaped part 9, while the thermoplastic polymer 7 is insoluble and remains in the shaped part 9. The shaped part 9 acquires a microporous structure as a result of the removal of the plasticizer 5. The solvent 6 has a temperature $T_L$. The temperature $T_L$ is such that: $20°\text{C}.\leq T_L \leq 100°\text{C}.$, in particular $25°\text{C}.\leq T_L \leq 80°\text{C}.$, in particular $30°\text{C}.\leq T_L \leq 60°\text{C}.$ From 30% to 100%, in particular from 50% to 90%, in particular from 60% to 80%, of the plasticizer 5 is removed from the shaped part 9 by means of the solvent 6. After the chemical binder removal, the shaped part 9 is also referred to as brown part. After a time $\Delta t_0$, the chemical binder removal is stopped and the shaped part 9 is taken from the solvent 6. The time $\Delta t_0$ is dependent on the component geometry and in particular is proportional to the square of the wall thickness of the shaped part 9.

Figure 7:
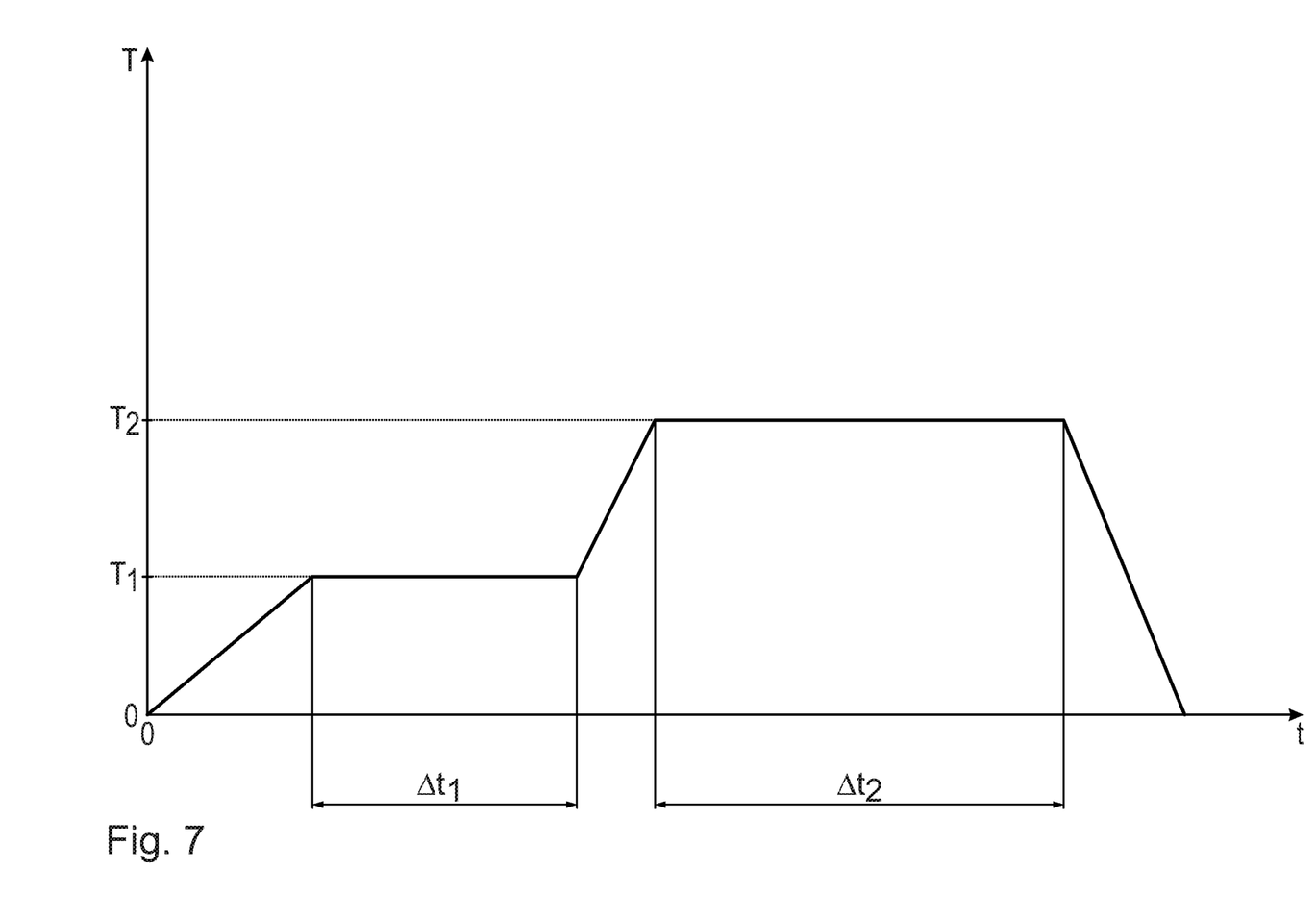
FIG. 7 is a view of a schematic temperature profile for thermal binder removal and for sintering of the shaped part.

In a process step $S_8$, the shaped part 9 is, after the chemical binder removal, subjected to thermal binder removal and subsequently sintered in a process step $S_9$. The thermal binder removal and the sintering are carried out by means of a heating device under inert gas atmosphere or in a reducing atmosphere or in the high vacuum. To effect thermal binder removal, the shaped part 9 is brought to a first temperature $T_1$. The first temperature $T_1$ is such that: $300°\text{C}.\leq T_1 \leq 900°\text{C}.$, in particular $400°\text{C}.\leq T_1 \leq 800°\text{C}.$, in particular $550°\text{C}.\leq T_1 \leq 750°\text{C}.$ In the thermal binder removal, the binder 4, i.e. the thermoplastic polymer 7 and optionally residual plasticizer 5, is burnt out from the shaped part 9 at the first temperature $T_1$ and the binder 4 is thus thermally removed. Here, the substrate particles 3 partly form sintering necks, so that the shaped part 9 is held together despite removal of the thermoplastic polymer 7. Owing to the microporous structure of the shaped part 9, thermal binder removal occurs quickly and uniformly. The thermal removal of the binder 4 is carried out over a time $\Delta t_1$. The time $\Delta t_1$ is dependent on the component geometry and in particular is proportional to the square of the wall thickness of the component 1 to be produced. The time $\Delta t_1$ is preferably selected so that at least 95%, in particular at least 99%, in particular at least 99.9% of the binder 4 is removed.

The shaped part 9 is subsequently brought, in the process step $S_9$, to a second temperature $T_2$ which is higher than the first temperature $T_1$. Sintering of the shaped part 9 occurs at the temperature $T_2$. The second temperature $T_2$ is such that: 600° C.≤$T_2$≤2400° C., in particular 800° C.≤$T_2$≤2200° C., in particular 1100° C.≤$T_2$≤2000° C. Sintering is carried out for a time $\Delta t_2$. The time $\Delta t_2$ is dependent on the component geometry and in particular is proportional to the square of the wall thickness of the component 1 to be produced. The time $\Delta t_2$ is preferably so long that no relevant change in a porosity of the component 1 can be achieved by subsequent further sintering. The sintering is preferably carried out until the porosity P obeys: 0.01≤P≤0.15, in particular 0.03≤P≤0.12, in particular 0.05≤P≤0.09.

After sintering, at least 90%, in particular at least 95%, in particular at least 99.9%, of the binder 4 has been removed from the shaped part 9. The additively manufactured component 1 is present after sintering.

Figure 8:
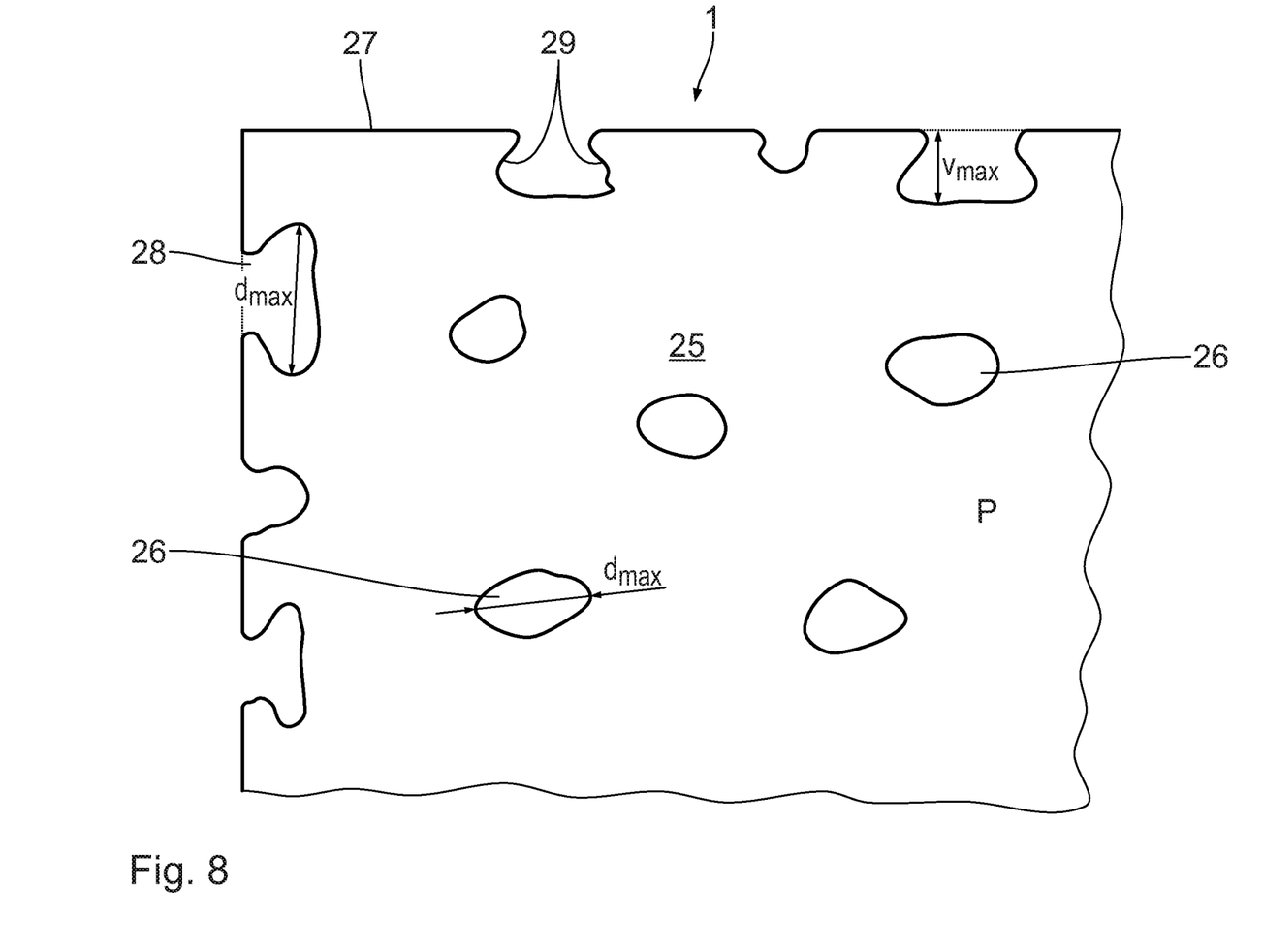
FIG. 8 is a view of an enlarged section of an additively manufactured component after sintering.

The component 1 is, dependent on the use of metallic and/or vitreous and/or ceramic substrate particles 3, composed of metal and/or glass and/or ceramic. In an interior 25 of the component, the component 1 has closed pores 26. At a component surface 27, the component 1 has open pores 28. The component 1 has a microporous structure which is such that at least 80%, in particular at least 85%, in particular 90%, of the pores 26, 28 have a maximum dimension $d_{max}$ in the range from 1 μm to 100 μm, in particular from 10 μm to 80 μm, in particular from 20 μm to 60 μm. The component 1 has a porosity P which is defined as the ratio of a pore volume to a component volume. The component volume comprises the material volume and the volumes of the closed pores 26. The porosity P is such that: 0.01≤P≤0.15, in particular 0.03≤P≤0.12, in particular 0.05≤P≤0.09.

Owing to their shape, the open pores 28 at the component surface 27 at least partly form undercuts 29. For example, the open pores 28 have a droplet-like shape extending from the component surface 27, so that these pores widen in the direction of the interior 25 of the component and form the undercuts 29. Owing to the open pores 28, the component surface 27 has a surface roughness $r_z$. The surface roughness $r_z$ is such that: 5 μm≤$r_z$≤200 μm, in particular 10 μm≤$r_z$≤120 μm, in particular 15 μm≤$r_z$≤100 μm. The surface roughness $r_z$ is defined in accordance with DIN EN ISO 4287 (version: October 1998) and is measured by the profile method in accordance with DIN EN ISO 4288 (version: April 1998).

While specific embodiments of the invention have been shown and described in detail to illustrate the application of the principles of the invention, it will be understood that the invention may be embodied otherwise without departing from such principles.

The invention claimed is:

1. A process for the additive manufacture of a component, the process comprising the steps:
providing substrate particles and a binder, wherein the substrate particles comprise one or more of metallic substrate particles, vitreous substrate particles and ceramic substrate particles, wherein the binder comprises a thermoplastic polymer and at least one additive;
producing a shaped part, wherein a layer of substrate particles and binder being produced and the binder being selectively melted by electromagnetic radiation to produce a shaped part layer, at least one further layer of substrate particles and binder being produced and the binder being selectively melted by the electromagnetic radiation to produce at least one further shaped part layer, wherein the binder has a melt viscosity of from 1 Pa·s to less than 500 Pa·s at a temperature which is at 10° C. above a temperature $T_s$, wherein the temperature $T_s$ is one of a glass transition temperature and a crystallite melting temperature of the binder;
taking the shaped part out from the layers produced;
removing the binder from the shaped part, with the at least one additive being removed from the shaped part at least partly before the thermoplastic polymer; and
sintering the shaped part to obtain the component.

2. The process as claimed in claim 1, wherein the substrate particles and the binder form composite particles.

3. The process as claimed in claim 1, wherein the thermoplastic polymer is present in a proportion of from 10% to 70% in the binder.

4. The process as claimed in claim 1, wherein the at least one additive is present in a proportion of from 30% to 90% in the binder.

5. The process as claimed in claim 1, wherein each of the substrate particles has a maximum dimension and the maximum dimension of at least 80% of the substrate particles is equal to or greater than 1 μm and equal to or less than 50 μm.

6. The process as claimed in claim 1, wherein the thermoplastic polymer comprises at least one of polycondensates, polymerizates, polyadducts and thermoplastic elastomers.

7. The process as claimed in claim 1, wherein the at least one additive comprises a plasticizer.

8. The process as claimed in claim 1, wherein the layers are applied in a thickness equal to or greater than 0.05 mm and equal to or less than 0.3 mm.

9. The process as claimed in claim 1, wherein the substrate particles and the binder are distributed in a construction region to form at least one of the layer, wherein a temperature in a construction region is equal to or greater than 20° C. and equal to or less than one of a glass transition temperature and a crystallite melting temperature of the binder.

10. The process as claimed in claim 1, wherein the at least one additive is dissolvable by a solvent and the thermoplastic polymer is insoluble in the solvent and the at least one additive is removed at least partially from the shaped part by the solvent.

11. The process as claimed in claim 1, wherein the shaped part is dipped into a solvent in order to remove the at least one additive, wherein a temperature of the solvent is equal to or greater than 20° C. and equal to or less than 100° C.

12. The process as claimed in claim 1, wherein from 30% to 100% of the at least one additive is removed from the shaped part by a solvent.

13. The process as claimed in claim 1, wherein the binder is at least partly removed thermally from the shaped part at a first temperature, wherein the first temperature is equal to or greater than 300° C. and equal to or less than 900° C.

14. The process as claimed in claim 1, wherein a thermal removal of the binder is carried out in one of an inert gas atmosphere and reducing atmosphere.

15. The process as claimed in claim 1, wherein at least 95% of the binder has been removed from the shaped part after sintering.

16. The process as claimed in claim 1, wherein sintering is carried out at a second temperature, whereinthe second temperature is equal to or greater than 600° C. and equal to or less than 2400° C.

17. The process as claimed in claim 1, wherein the at least one additive is dissolvable by a solvent and the thermoplastic polymer is insoluble in the solvent and the at least one additive is removed at least partially from the shaped part by the solvent and wherein the binder is at least partly removed thermally from the shaped part at a first temperature, wherein the first temperature is equal to or greater than 300° C. and equal to or less than 900° C.

18. The process as claimed in claim 1, wherein the at least one additive serves to influence the rheological properties of the binder.

19. The process as claimed in claim 1, wherein the binder is a partially crystalline binder.

20. The process as claimed in claim 2, wherein each of the composite particles comprises a plurality of the substrate particles.

21. The process as claimed in claim 2, wherein the composite particles have a fluidity which is defined by a Hausner number in accordance with VDI Guideline VDI 3405 sheet 1, wherein the Hausner number $H_R$ is equal to or greater than one and less than or equal to one and a half.

22. The process as claimed in claim 2, wherein each of the composite particles has a maximum dimension and the maximum dimension of at least 80% of the composite particles equal to or greater than 0.005 mm and equal to or less than 0.3 mm.

23. The process as claimed in claim 2, wherein each of the composite particles has a minimum dimension and a maximum dimension and a ratio of the minimum dimension to the maximum dimension for at least 80% of the composite particles is equal to or greater than 0.6 and less than or equal to one.

24. The process as claimed in claim 2, wherein the substrate particles are present in a proportion of from 40% by volume to 70% by volume in the composite particles.

25. The process as claimed in claim 7, wherein the at least one additive comprises an ester of an aromatic hydroxybenzoic acid.

26. A process for the additive manufacture of a component, the process comprising the steps:
providing substrate particles and a binder, wherein the substrate particles comprise one or more of metallic substrate particles, vitreous substrate particles and ceramic substrate particles, wherein the binder comprises a thermoplastic polymer and at least one additive;
producing a shaped part, wherein a layer of substrate particles and binder being produced and the binder being selectively melted by electromagnetic radiation to produce a shaped part layer, at least one further layer of substrate particles and binder being produced and the binder being selectively melted by the electromagnetic radiation to produce at least one further shaped part layer, wherein the binder has a melt viscosity of from 1 Pa·s to less than 10 Pa·s at a temperature which is at as 10° C. above a temperature $T_s$, wherein the temperature $T_s$ is one of a glass transition temperature and a crystallite melting temperature of the binder;
taking the shaped part out from the layers produced;
removing the binder from the shaped part, with the at least one additive being removed from the shaped part at least partly before the thermoplastic polymer; and
sintering the shaped part to obtain the component.

27. The process as claimed in claim 26, wherein the substrate particles and the binder form composite particles, wherein the substrate particles are present in a proportion of from 30% by volume to 60% by volume in the composite particles.

28. A process for the additive manufacture of a component, the process comprising the steps:
providing substrate particles and a binder, wherein the substrate particles comprise one or more of metallic substrate particles, vitreous substrate particles and ceramic substrate particles, wherein the binder comprises a thermoplastic polymer and at least one additive;
producing a shaped part, wherein a layer of substrate particles and binder being produced and the binder being selectively melted by electromagnetic radiation to produce a shaped part layer, at least one further layer of substrate particles and binder being produced and the binder being selectively melted by the electromagnetic radiation to produce at least one further shaped part layer, wherein the binder has a melt viscosity of from 1 Pa·s to less than 50 Pa·s at a temperature which is 10° C. above a temperature $T_s$, wherein the temperature $T_s$ is one of a glass transition temperature and a crystallite melting temperature of the binder;
taking the shaped part out from the layers produced;
removing the binder from the shaped part, with the at least one additive being removed from the shaped part at least partly before the thermoplastic polymer; and
sintering the shaped part to obtain the component.

29. The process as claimed in claim 28, wherein the substrate particles and the binder form composite particles, wherein the substrate particles are present in a proportion of from 30% by volume to 60% by volume in the composite particles.

* * * * *